(12) United States Patent
Masuda

(10) Patent No.: US 10,156,485 B2
(45) Date of Patent: *Dec. 18, 2018

(54) MAGNETIC LOAD SENSOR AND ELECTRIC BRAKE SYSTEM

(71) Applicant: NTN CORPORATION, Osaka (JP)

(72) Inventor: Yui Masuda, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,625

(22) Filed: Feb. 8, 2017

(65) Prior Publication Data

US 2017/0146410 A1    May 25, 2017

Related U.S. Application Data

(63) Continuation of application No. 14/759,237, filed on Jul. 6, 2015, now Pat. No. 9,599,523.

(30) Foreign Application Priority Data

Jan. 10, 2013 (JP) .................................. 2013-002481

(51) Int. Cl.
| | |
|---|---|
| *F16D 66/00* | (2006.01) |
| *G01L 1/04* | (2006.01) |
| *G01L 1/12* | (2006.01) |
| *F16D 55/225* | (2006.01) |
| *G01L 5/28* | (2006.01) |
| *F16D 65/12* | (2006.01) |

(Continued)

(52) U.S. Cl.
CPC ............ *G01L 1/122* (2013.01); *F16D 55/225* (2013.01); *F16D 65/12* (2013.01); *F16D 66/00* (2013.01);

(Continued)

(58) Field of Classification Search
CPC .. F16D 55/225; F16D 66/00; F16D 2066/005; G01D 5/12; G01D 5/125;

(Continued)

(56) References Cited

U.S. PATENT DOCUMENTS 4,747,313 A * 5/1988 Okada .................... G01L 5/166
                                                        73/862.043
7,117,748 B2 * 10/2006 Baumann .............. B60T 13/741
                                                        73/779

(Continued)

FOREIGN PATENT DOCUMENTS

| DE | 102010026516 | 1/2012 |
|---|---|---|
| JP | 58-201041 | 11/1983 |

(Continued)

OTHER PUBLICATIONS

International Search Report dated Feb. 10, 2014 in International (PCT) Application No. PCT/JP2014/050054.

*Primary Examiner* — Thomas J Williams
(74) *Attorney, Agent, or Firm* — Wenderoth, Lind & Ponack, L.L.P.

(57) ABSTRACT

A magnetic load sensor is provided which is high in axial rigidity. The load sensor includes a pair of parallel plate coupled together by coupling pieces. The coupling pieces are inclined relative to the axial direction such that when an axial load is applied to the parallel plates, the parallel plates are displaced relative to each other in a direction perpendicular to the axial direction, due to deflection of the coupling pieces. A magnetic target is mounted to the parallel plate, and a magnetic sensor element is mounted to the parallel plate such that when the parallel plates are displaced relative to each other in the direction perpendicular to the axial direction, the magnetic target and the magnetic sensor element are displaced relative to each other in the direction perpendicular to the axial direction.

7 Claims, 10 Drawing Sheets

(51) Int. Cl.
*G01D 5/12* (2006.01)
*G01L 5/22* (2006.01)

(52) U.S. Cl.
CPC ............ *G01D 5/12* (2013.01); *G01L 5/28* (2013.01); *F16D 2066/005* (2013.01); *G01L 5/225* (2013.01)

(58) Field of Classification Search
CPC .......... G01D 5/14; G01D 5/142; G01D 5/145; G01D 1/12; G01D 1/122; G01D 1/04; G01D 1/048
See application file for complete search history.

(56) References Cited

U.S. PATENT DOCUMENTS

| | | | | |
|---|---|---|---|---|
| 9,035,731 | B2* | 5/2015 | Brandl | F16F 1/025 335/205 |
| 9,429,487 | B2* | 8/2016 | Masuda | F16D 65/18 |
| 9,528,889 | B2* | 12/2016 | Masuda | F16D 65/18 |
| 9,599,523 | B2* | 3/2017 | Masuda | G01L 1/122 |
| 2004/0187591 | A1 | 9/2004 | Baumann et al. | |
| 2011/0174581 | A1 | 7/2011 | Vollert et al. | |
| 2012/0103733 | A1 | 5/2012 | Sekiguchi | |
| 2015/0355038 | A1* | 12/2015 | Masuda | G01L 1/122 188/1.11 E |
| 2016/0015311 | A1* | 1/2016 | Jiang | A61F 2/80 623/33 |

FOREIGN PATENT DOCUMENTS

| | | |
|---|---|---|
| JP | 11-264779 | 9/1999 |
| JP | 2004-301835 | 10/2004 |
| JP | 2005221418 A * | 8/2005 |
| JP | 2010-265971 | 11/2010 |
| JP | 2012-503162 | 2/2012 |
| JP | 2012-093213 | 5/2012 |

* cited by examiner

MAGNETIC LOAD SENSOR AND ELECTRIC BRAKE SYSTEM

TECHNICAL FIELD

This invention relates to a magnetic load sensor, and an electric brake system using this magnetic load sensor.

BACKGROUND ART

Typically, an electric brake system is configured to convert the rotation of an electric motor to an axial movement of a friction pad to press the friction pad against a brake disk, thereby generating a braking force. In order to control the braking force to a desired magnitude, many of such electric brake systems include a load sensor mounted at a portion which receives an axially rearward reaction force that acts on the friction pad when the friction pad is pressed against the brake disk.

Such a load sensor mounted in an electric brake system is disclosed in the JP Patent Publication 2004-301835. The load sensor disclosed in that document includes a magnetic target which generates a magnetic field, a magnetic sensor element configured to detect the magnitude of the magnetic field generated by the magnetic target, and a spring configured to be deformed in the axial direction when an axial load is applied. The magnetic target is mounted to the spring, while the magnetic sensor element is fixed in position to face the magnetic target in a direction perpendicular to the axial direction.

The load sensor is configured such that when an axial load is applied to the spring, the magnetic target and the magnetic sensor element are displaced relative to each other in the axial direction. Corresponding to the relative displacement between the magnetic target and the magnetic sensor element, the magnitude of the magnetic field detected by the magnetic sensor element changes. Thus, it is possible to detect the magnitude of the axial load based on the output signal of the magnetic sensor element.

This load sensor has a problem in that since the direction in which the load is applied (axial direction) is the same as the direction in which the magnetic target and the magnetic sensor element are displaced when the load is applied (axial direction), it is difficult to simultaneously achieve both sufficient axial rigidity of the load sensor and sufficient detection accuracy of the load sensor.

That is, in order to increase the axial rigidity of the load sensor, it is necessary to use a spring having high rigidity. However, the higher the rigidity of the spring, the smaller the relative displacement between the magnetic target and the magnetic sensor element, and thus the lower the resolution of the load, i.e. the detection accuracy of the load, tends to be. Conversely, in order to increase the detection accuracy of the load, it is necessary to increase the relative displacement between the magnetic target and the magnetic sensor element by using a spring having lower rigidity, thereby increasing the resolution of the load. This solution, however, results in a reduction in axial rigidity of the load sensor.

Especially if the load sensor is mounted in a vehicle electric brake system, if the load sensor is low in axial rigidity (namely, if the load sensor tends to be deformed markedly in the axial direction when an axial load is applied to the load sensor), this could deteriorate brake response, and/or destabilize feedback control of the load applied to the electric brake. It is therefore important to ensure high axial rigidity of the load sensor. It is also equally important to ensure high detection accuracy of the load.

An object of the present invention is to provide a load sensor which is high in axial rigidity.

Means for Achieving the Object

The inventor of the present application discovered that the load sensor disclosed in prior art publication JP 2004-301835 cannot achieve both sufficiently high axial rigidity of the load sensor and sufficiently high detection accuracy because the direction in which a load is applied is the same as the direction in which the magnetic target and the magnetic sensor element are displaced relative to each other when the load is applied (namely, both directions are the axial direction). Based on this discovery, the present invention provides:

a magnetic load sensor comprising:

a magnetic target configured to generate a magnetic field;

a magnetic sensor element configured to detect the magnitude of the magnetic field generated by the magnetic target;

a pair of parallel plates spaced apart from each other in the axial direction and extending parallel to each other; and at least one coupling piece through which the parallel plates are coupled together, wherein the coupling piece is inclined relative to the axial direction such that when a load in the axial direction is applied to the parallel plates, the coupling piece is deflected in such a manner that the parallel plates are displaced relative to each other in a direction perpendicular to the axial direction, wherein the magnetic target and the magnetic sensor element are mounted to one and the other of the parallel plates, respectively, such that when the parallel plates are displaced relative to each other in said direction perpendicular to the axial direction, the magnetic target and the magnetic sensor element are displaced relative to each other in said direction perpendicular to the axial direction.

With this arrangement, when an axial load is applied to the two parallel plates, the parallel plates are displaced relative to each other in a direction perpendicular to the axial direction due to deflection of the coupling piece. As a result, the magnetic target mounted to one of the parallel plates and the magnetic sensor element mounted to the other of the parallel plates are displaced relative to each other in the above direction parallel to the axial direction. Since the magnitude of the magnetic field detected by the magnetic sensor element changes corresponding to the relative displacement between the magnetic target and the magnetic sensor element, it is possible to detect the magnitude of the axial load based on the output signal of the magnetic sensor element. Also, since the relative displacement between the parallel plates in the axial direction when an axial load is applied is sufficiently small compared to the amount of relative displacement between the magnetic target and the magnetic sensor element (i.e. the amount of relative displacement between the parallel plates in the direction perpendicular to the axial direction), the load sensor is high in axial rigidity.

Preferably, the at least one coupling piece comprises a plurality of coupling pieces disposed between the parallel plates so as to be circumferentially spaced apart from each other, the respective coupling pieces are inclined in one circumferential direction such that when a load in the axial direction is applied to the parallel plates, the parallel plates are moved relative to each other in the circumferential direction with the centers of the respective parallel plates kept stationary.

With this arrangement, since the parallel plates are moved in the circumferential direction with their centers kept stationary when an axial load is applied, it is possible to support one of the two parallel plates with a thrust bearing. This makes it easier to mount the load sensor in a device which generates axial loads (such as an electric brake system).

Preferably, the magnetic target has a first N-pole and a first S-pole which are magnetized in a direction perpendicular to the direction in which the magnetic target and the magnetic sensor element are displaced relative to each other when the parallel plates are displaced relative to each other in said direction perpendicular to the axial direction, and which are arranged adjacent to each other in the direction in which the magnetic target and the magnetic sensor element are displaced relative to each other, and the magnetic sensor element is disposed in the vicinity of the boundary between the adjacent first N-pole and first S-pole.

With this arrangement, high-density magnetic fluxes which are arranged adjacent to each other in the direction in which the magnetic target and the magnetic sensor element are displaced relative to each other, and which are opposite in direction are generated in the vicinity of the boundary between the above-mentioned first N-pole and first S-pole of the magnetic target, and these magnetic fluxes penetrate the magnetic sensor element. As a result, the output signal of the magnetic sensor element changes steeply corresponding to a very small relative movement between the magnetic target and the magnetic sensor element, so that it is possible to detect the magnitude of the load applied to the parallel plates with high accuracy. Also, since the output signal of the magnetic sensor element shows a tendency to change steeply in response to the relative displacement between the magnetic target and the magnetic sensor element when the parallel plates are displaced relative to each other in a direction perpendicular to the axial direction, and to hardly change in response to a relative displacement between the magnetic target and the magnetic sensor element in any other direction, the output signal of the magnetic sensor is less likely to be affected by external vibrations. Thus, it is possible to stably detect the magnitude of the load with stable accuracy.

The magnetic target may consist of a single multipole permanent magnet including a first N-pole and a first S-pole facing the magnetic sensor element, and a second S-pole and a second N-pole provided opposite to the first N-pole and a second S-pole, respectively. Preferably, however, the magnetic target includes two permanent magnets each having N- and S-poles at the respective ends, and bonded together so as to be arranged in opposite directions to each other. In particular, the two permanent magnets are bonded together with the N-pole of one of the two permanent magnets disposed adjacent to the S-pole of the other permanent magnet, and the S-pole of the one permanent magnet arranged adjacent to the N-pole of the other permanent magnet. With this arrangement, it is possible to effectively increase the densities of the magnetic fluxes which are generated in the vicinity of the boundary between the N- and S-poles of the magnetic target and which are opposite in direction. This in turn makes it possible to detect the load applied to the parallel plates and with extremely high accuracy.

When the parallel plates are moved relative to each other in the circumferential direction with their centers kept stationary, the distance by which the parallel plates move relative to each other in the circumferential direction is larger at their radially outer portions than at their radially inner portions. Thus, preferably, the magnetic target and the magnetic sensor element are provided, respectively, on the opposed surfaces of the respective parallel plates, to detect the load with higher accuracy.

The present invention also provides an electric brake system comprising an electric motor, and a motion converter mechanism configured to convert the rotational motion of the electric motor to an axial movement of a friction pad, and configured to generate a braking force by pressing the friction pad against a brake disk, wherein the magnetic load sensor according to the present invention is mounted at a portion which receives an axially rearward reaction force that acts on the friction pad when the friction pad is pressed against the brake disk.

Advantages of the Invention

The magnetic load sensor according to the present invention is configured such that when an axial load is applied thereto, the magnetic target and the magnetic sensor element are displaced relative to each other in a direction perpendicular to the direction in which the axial load is applied. This load sensor is therefore high in axial rigidity.

BRIEF DESCRIPTION OF THE DRAWINGS

FIG. 15($b$) shows a state in which the distance between a rotary disk and a linear motion disk has increased as a result of relative rotation between the two disks from the state of FIG. 15($a$).

DETAILED DESCRIPTION OF THE INVENTION

Figure 1:
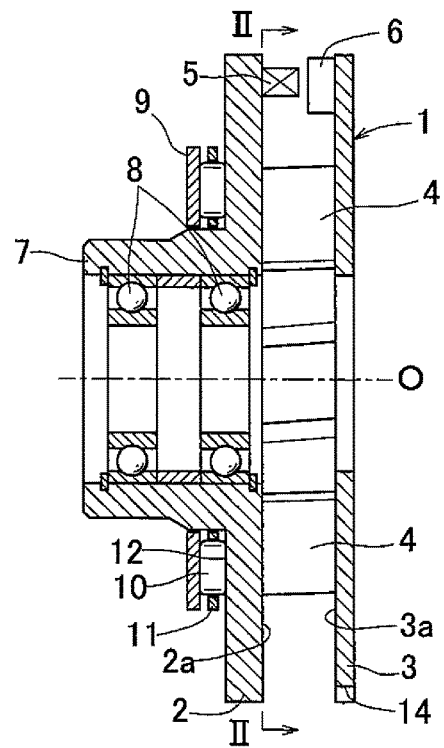
FIG. 1 is a sectional view of a magnetic load sensor embodying the present invention.

FIG. 1 shows a magnetic load sensor 1 embodying the present invention. This load sensor 1 includes a pair of parallel plates 2 and 3 extending parallel to, and axially spaced apart from, each other, and coupled together by a plurality of coupling pieces 4. The load sensor 1 further includes a magnetic target 5 mounted to the first parallel plate 2, and a magnetic sensor element 6 mounted to the second parallel plate 3.

The parallel plate 2 is an annular disk-shaped member having a circular outer periphery, as viewed from the axial direction. The parallel plate 2 may be made of metal such as iron. The parallel plate 2 is integrally formed with a cylindrical portion 7 extending from the radially inner edge of the parallel plate 2 in the direction away from the parallel plate 3. Radial bearings 8 are mounted in the cylindrical portion 7, and support a rotary shaft 30 (see FIG. 10).

The parallel plate 2 is axially supported by a thrust bearing 9. The thrust bearing 9 includes a plurality of circumferentially spaced apart rolling elements 10, and a retainer 11 keeping the rolling elements 10 spaced apart from each other. The parallel plate 2 has, on its surface opposite from its surface facing the parallel plate 3, a raceway 12 with which the rolling elements 10 of the thrust bearing 9 are brought into rolling contact. As shown, if needle rollers or cylindrical rollers, which are high in load resistance, are used as the rolling elements 10, the raceway 12 is a continuous annular flat surface hardened by heat treatment (such as induction hardening). If balls are used as the rolling elements 10, the raceway 12 comprises an inner wall of an annular continuous groove hardened by heat treatment.

As with the parallel plate 2, the parallel plate 3 is also an annular disk-shaped member having a circular outer periphery, as viewed from the axial direction. The parallel plate 3 may be made of metal such as iron. The parallel plate 3 has an outer diameter larger than or equal to the outer diameter of the parallel plate 2. The parallel plate 3 is formed with a recess 14 in its outer periphery in which an anti-rotation key member 13 (see FIG. 10) is engaged to prevent circumferential movement of the parallel plate. Instead of the recess 14, an anti-rotation protrusion may be formed.

Figure 3:
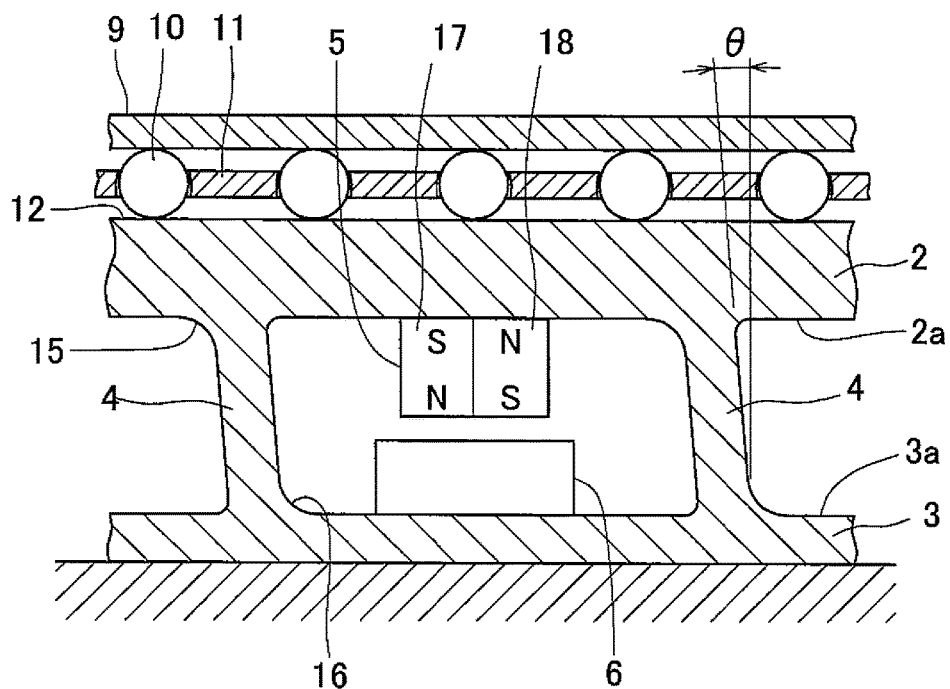
FIG. 3 is an enlarged sectional view taken along line III-III of FIG. 2.

The coupling pieces 4 are disposed between parallel plates 2 and 3 with one end of each coupling piece 4 connected to the opposed surface 2a of the parallel plate 2 facing the parallel plate 3, and the other end connected to the opposed surface 3a of the parallel plate 3 facing the parallel plate 2. While the coupling pieces 4 may be connected to the parallel plates 2 and 3 by welding, the coupling pieces 4 and the parallel plates 2 and 3 are more preferably connected together by forming them as a seamless integral body as shown in FIG. 3. This improves durability of the connecting portions between the coupling pieces 4 and the parallel plates 2 and 3.

The coupling pieces 4 and the parallel plates 2 and 3 can be formed as an integral body by metal injection, in which the integral body is formed by injecting under high pressure a mixture of metal powder and a small amount of resin into a mold to form a molded article, and then by placing the molded article in a heating furnace to evaporate the resin.

Figure 2:
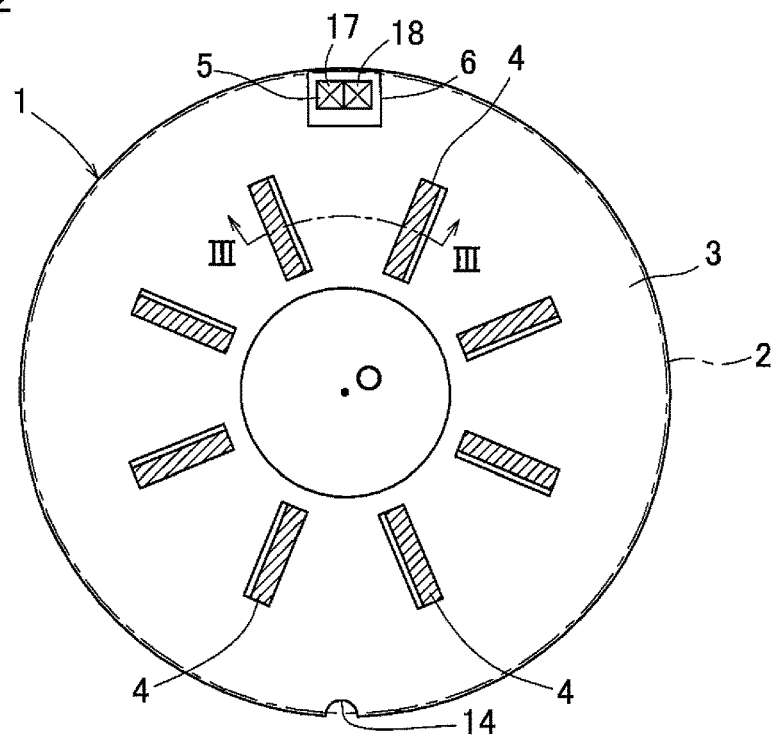
FIG. 2 is a sectional view taken along line II-II of FIG. 1.

As shown in FIG. 2, the coupling pieces 4 are equidistantly spaced apart from each other in the circumferential direction with respect to the center axis O of the parallel plates 2 and 3. The coupling pieces 4 are plate members arranged such that the thickness directions of the plate members coincide with the circumferential direction. Also, the coupling pieces 4 are inclined relative to the axial direction (direction perpendicular to the sheet on which FIG. 2 is drawn).

The coupling pieces 4 are all inclined in one of the opposite circumferential directions. In particular, the coupling pieces 4 are inclined such that the end of each coupling piece 4 on the side of the parallel plate 2 is circumferentially displaced from the end of the same coupling piece 4 on the side of the parallel plate 3 in the counterclockwise direction. With this arrangement, when an axial load is applied to the parallel plates 2 and 3, the coupling pieces 4 are deflected such that the parallel plates 2 and 3 are moved relative to each other in the circumferential direction, while remaining parallel to each other, with the center axis O remaining stationary.

As shown in FIG. 2, the coupling pieces 4 are inwardly spaced apart from the outer peripheries of the parallel plates 2 and 3, and thus couple together the radially inner portions of the parallel plates 2 and 3. With this arrangement, the parallel plates 2 and 3 are circumferentially movable a larger distance relative to each other when the coupling pieces 4 are deflected.

As shown in FIG. 3, the inclination angles θ of the respective coupling pieces 4 are determined at 75 to 87 degrees, preferably 80 to 85 degrees, while no load is applied to the parallel plates 2 and 3. By setting the inclination angles θ at 87 degrees or less, preferably at 85 degrees or less, the coupling pieces 4 are reliably deflected when an axial load is applied to the parallel plates 2 and 3. As used herein, the word "deflection" refers to deformation of the coupling pieces 4 which causes one and the other ends of each coupling piece 4 to move relative to each other in a direction perpendicular to the axial direction. By setting the inclination angles θ at 75 degrees or larger, preferably at 80 degrees or larger, it is possible to keep the axial relative movement between the parallel plates 2 and 3 to a sufficiently small value compared to the relative movement between the parallel plates 2 and 3 in a direction perpendicular to the axial direction, when the coupling pieces 4 are deflected.

The obtuse corner between each coupling piece 4 and the parallel plate 2 is formed into a rounded corner portion 15 having a circular arc section. The obtuse corner between each coupling piece 4 and the parallel plate 3 is also formed into a rounded corner portion 16 having a circular arc section. The arcuate corner portions 15 and 16 effectively prevent formation of cracks due to fatigue at the connecting portions between the coupling pieces 4 and the respective parallel plates 2 and 3.

As shown in FIG. 1, the magnetic target 5 and the magnetic sensor element 6 are fixed to a radially outer portion of the opposed surface 2a of the parallel plate 2 facing the parallel plate 3, and to a radially outer portion of the opposed surface 3a of the parallel plate 3 facing the parallel plate 2, respectively, so as to face each other such that the magnetic sensor element 6 can detect the magnetic field generated by the magnetic target 5.

As shown in FIG. 3, the magnetic target 5 includes two permanent magnets 17 and 18 each magnetized in the longitudinal direction such that N- and S-poles are provided at the respective ends. Further, the permanent magnets 17 and 18 are bonded to each other while being arranged upside down relative to each other such that the N- and S-poles of the permanent magnet 17 are disposed adjacent to the S- and N-poles of the permanent magnet 18, respectively. Also, the magnetic target 5 is fixed to the parallel plate 2 with the two permanent magnets 17 and 18 adjoined to each other in the circumferential direction (right and left direction in FIG. 3).

If neodymium magnets are used as the permanent magnets 17, 18, such magnets can generate strong magnetic fluxes while taking up small space. However, samarium-cobalt magnets, samarium-iron-nitride magnets, Alnico magnets, ferrite magnets or praseodymium magnets may be used instead. By using samarium-cobalt magnets, samarium-iron-nitride magnets or Alnico magnets, magnetic fluxes are less likely to decrease with an increase in temperature of the permanent magnets 17 and 18. By using praseodymium magnets, the mechanical strength of the permanent magnets 17 and 18 increases.

The magnetic sensor element 6 is arranged to face the magnetic target 5 in the vicinity of the boundary between adjacent magnetic poles of the respective permanent magnets 17 and 18. As the magnetic sensor element 6, a magneto-resistance element (known as an MR sensor), or a magneto-impedance element (known as an MI sensor) may be used. However, a Hall IC is advantageous from an economical point of view. A Hall IC is especially suited for use in an electric brake because heat-resistant Hall IC's are now commercially available.

The N-pole and S-pole that face the magnetic sensor element 6 (namely, the N-pole of the permanent magnet 17 and the S-pole of the permanent magnet 18) are adjacent to each other in the direction in which the magnetic target 5 and the magnetic sensor element 6 move relative to each other when the parallel plates 2 and 3 move relative to each other due to deflection of the coupling pieces 4 (i.e. in the right and left direction in FIG. 3). Also, each of the N-pole and S-pole facing the magnetic sensor element 6 is magnetized in a direction perpendicular to the direction in which the magnetic target 5 and the magnetic sensor element 6 move relative to each other (in the vertical direction of FIG. 3).

Figure 4:
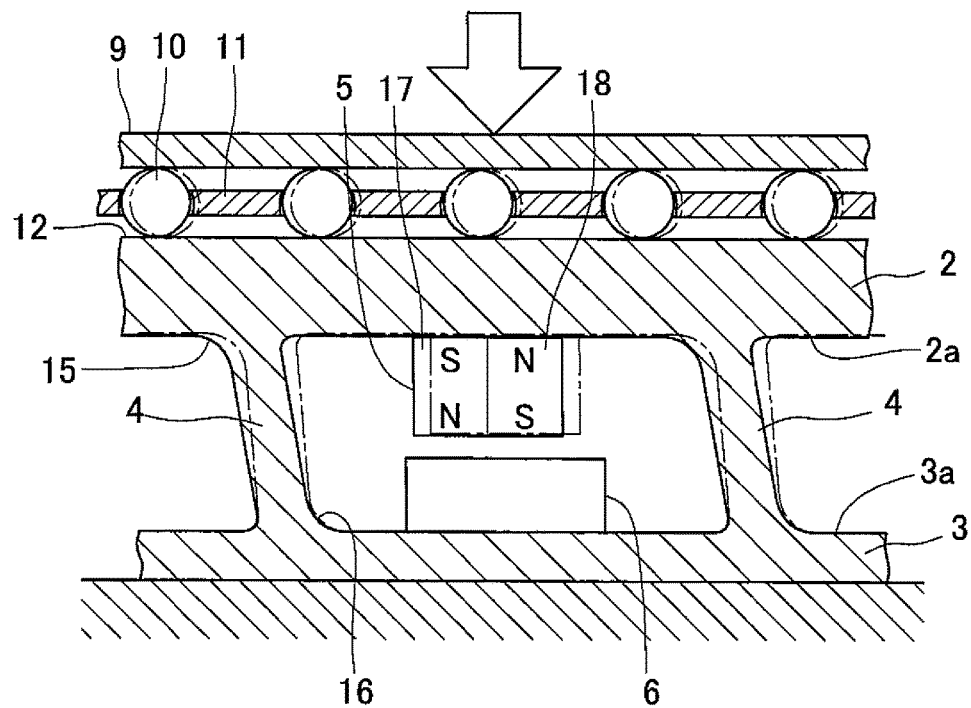
FIG. 4 is an enlarged sectional view showing a state in which an axial load is applied to two parallel plates shown in FIG. 3.

This load sensor 1 is configured such that when an axial load is applied to the parallel plates 2 and 3 as shown by the arrow in FIG. 4, the parallel plates 2 and 3 are moved relative to each other in a direction perpendicular to the axial direction due to deflection of the coupling pieces 4. As a result, the magnetic target 5 and the magnetic sensor element 6, which are mounted to the respective parallel plates 2 and 3, are moved relative to each other in the direction perpendicular to the axial direction. Due to the relative movement between the magnetic target 5 and the magnetic sensor element 6, the magnitude of the magnetic field detected by the magnetic sensor element 6 changes. Thus, by grasping the relationship between the magnitude of the axial load applied to the parallel plates 2 and 3 and the output signal of the magnetic sensor element 6 beforehand, it is possible to detect the magnitude of the axial load based on the output signal of the magnetic sensor element 6.

The distance by which the magnetic target 5 and the magnetic sensor element 6 move relative to each other in the circumferential direction when an axial load is applied to the load sensor 1 is extremely small. For example, when the load sensor 1 is mounted in the below-described electric brake system, while an axial load of up to 30 kN is applied to the load sensor 1, this load can move the magnetic target 5 and the magnetic sensor element 6 only about 0.1 mm relative to each other in the circumferential direction.

Figure 5:
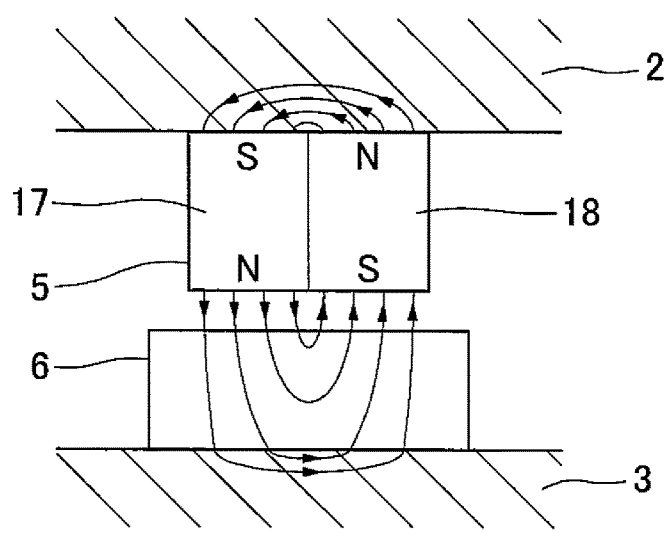
FIG. 5 schematically shows magnetic fluxes generated in the vicinity of a magnetic target shown in FIG. 3.

In order to detect such a minute relative displacement with high accuracy, in the load sensor 1 of this embodiment, the permanent magnets are arranged such that the N-pole of the permanent magnet 17 and the S-pole of the permanent magnet 18 are circumferentially adjacent to each other. With this arrangement, as shown in FIG. 5, high-density magnetic fluxes that are opposite in direction and adjacent to each other are generated in the vicinity of the boundary between the N-pole and the S-pole, and these fluxes penetrate the magnetic sensor element 6. As a result, the output signal of the magnetic sensor element 6 changes steeply in response to even a minute relative movement between the magnetic target 5 and the magnetic sensor element 6. This makes it possible to detect the magnitude of the load applied to the parallel plates 2 and 3 with high accuracy, even though the circumferential relative movement between the magnetic target 5 and the magnetic sensor element 6 is very small. If the parallel plate 3, i.e. the parallel plate located on the opposite side of the magnetic sensor element 6 from the magnetic target 5 is formed of a ferromagnetic material (such as iron), it is possible to effectively increase the density of magnetic fluxes that penetrate the magnetic sensor element 6.

In this magnetic sensor, as described above, when an axial load is applied to the parallel plates 2 and 3, the parallel plates 2 and 3 are moved relative to each other in a direction perpendicular to the axial direction due to deflection of the coupling pieces 4, as a result of which the magnetic target 5, mounted to the parallel plate 2, and the magnetic sensor element 6, mounted to the parallel plate 3, are moved relative to each other in a direction perpendicular to the axial direction. At this time, the magnitude of the magnetic field detected by the magnetic sensor element 6 changes in response to the relative movement between the magnetic target 5 and the magnetic sensor element 6, so that it is possible to detect the magnitude of the axial load based on the output signal of the magnetic sensor element 6. In other words, this load sensor 1 detects the axial load applied to the parallel plates 2 and 3, by converting the axial load to the circumferential relative movement between the magnetic target 5 and the magnetic sensor element 6.

Since the load sensor 1 is configured such that when an axial load is applied to the sensor the magnetic target 5 and the magnetic sensor element 6 are moved relative to each other in a direction perpendicular to the axial load, the load sensor 1 is high in rigidity in the axial direction. In other words, as shown in FIG. 4, when an axial load is applied to the two parallel plates 2 and 3, the connecting portions between the parallel plate 2 and the coupling pieces 4 move, in an approximate sense, along circular arcs having radii equal to the lengths of the respective coupling pieces 4, so that the displacement between the parallel plates 2 and 3 in the axial direction (up-and-down direction in FIG. 4) is sufficiently small compared to the relative displacement between the magnetic target 5 and the magnetic sensor element 6 (in the right and left direction in FIG. 4). Thus, when an axial load is applied, the load sensor 1 is deformed only a small amount, so that this load sensor is high in rigidity in the axial direction.

Since the magnetic target 5 is configured such that its N-pole and S-pole each magnetized in a direction perpendicular to the direction in which the magnetic target 5 and the magnetic sensor element 6 move relative to each other are arranged adjacent to each other in the direction in which the magnetic target 5 and the magnetic sensor element 6 move relative to each other, as shown in FIG. 5, high-density magnetic fluxes that are opposite in direction and adjacent to each other are generated in the vicinity of the boundary between the N-pole and the S-pole, and these fluxes penetrate the magnetic sensor element 6. As a result, the output signal of the magnetic sensor element 6 changes steeply in response to even a minute relative movement between the magnetic target 5 and the magnetic sensor element 6. This makes it possible to detect the magnitude of the load applied to the parallel plates 2 and 3 with high accuracy.

Also, by configuring the magnetic target 5 such that the N-pole and S-pole magnetized in a direction perpendicular to the direction in which the magnetic target 5 and the magnetic sensor element 6 are moved relative to each other are arranged adjacent to each other in the direction in which the magnetic target 5 and the magnetic sensor element 6 are moved relative to each other, the output signal of the magnetic sensor element 6, arranged opposite to the magnetic target 5, changes steeply in response to the relative displacement between the magnetic target 5 and the magnetic sensor element 6 in the direction in which the N-pole and S-pole are arranged, while hardly changing in response to the relative displacement between the magnetic target 5 and the magnetic sensor element 6 in any other direction. This minimizes the influence of external vibrations on the output signal of the magnetic sensor element 6, so that the load sensor can detect the magnitude of the load applied with stable accuracy.

Figure 6:
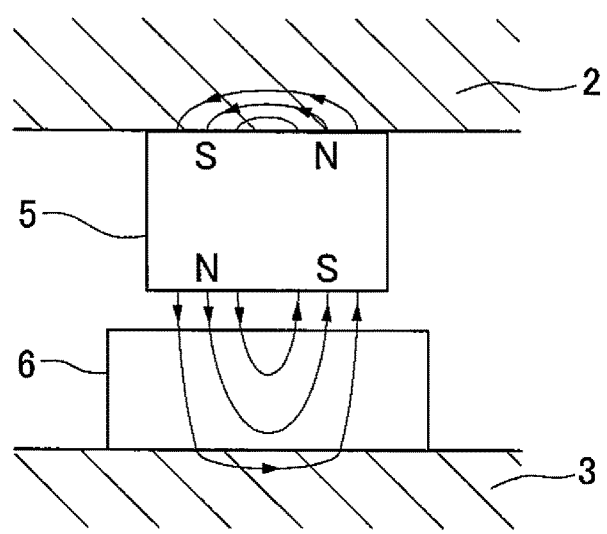
FIG. 6 schematically shows a modified example in which the magnetic target shown in FIG. 5 is replaced by a magnetic target consisting of a single permanent magnet.

As shown in FIG. 6, the magnetic target 5 may consist of a single multipole permanent magnet including a first N-pole and a first S-pole facing the magnetic sensor element 6, and a second S-pole and a second N-pole provided opposite to the first N-pole and the first S-pole, respectively. Preferably, however, the magnetic target 5 includes, as in the embodiment of FIG. 5, two permanent magnets 17 and 18 each having N- and S-poles at the respective ends, and bonded together so as to be arranged in opposite directions to each other. With the latter arrangement, it is possible to effectively increase the densities of the magnetic fluxes which are generated in the vicinity of the boundary between the N- and S-poles of the magnetic target 5 and which are opposite in direction. This in turn makes it possible to detect the load applied to the parallel plates 2 and 3 with extremely high accuracy.

When the parallel plates 2 and 3 are moved relative to each other in the circumferential direction due to deflection of the coupling pieces 4, with their centers O stationary, the circumferential relative displacement therebetween is greater at their radially outer portions than at their radially inner portions. Thus, the magnetic target 5 and the magnetic sensor element 6 are preferably provided at radially outer portions of the opposed surfaces 2a and 3a of the two parallel plates 2 and 3 so as to detect the load with higher accuracy.

Also, as shown in FIG. 2, the coupling pieces 4 are preferably provided to couple together the radially inner portions of the parallel plates 2 and 3. With this arrangement, compared to an arrangement in which the coupling pieces 4 are provided to couple together the radially outer portions of the parallel plates 2 and 3, the relative circumferential displacement between the parallel plates 2 and 3 due to deflection of the coupling pieces 4 is large, so that it is possible to detect the load with high accuracy.

Further, in this load sensor 1, a raceway 12 with which the rolling elements 10 of the thrust bearing 9 are brought into rolling contact is directly formed on parallel plate 2, and thus there is no separate member with which the rolling elements 10 are brought into rolling contact (raceway disk of an ordinary thrust bearing 9), the axial length of the load sensor 1 is correspondingly short. This makes the load sensor 1 more desirable for use in an electric brake system, which is required to be as short in axial length as possible.

Figure 7:
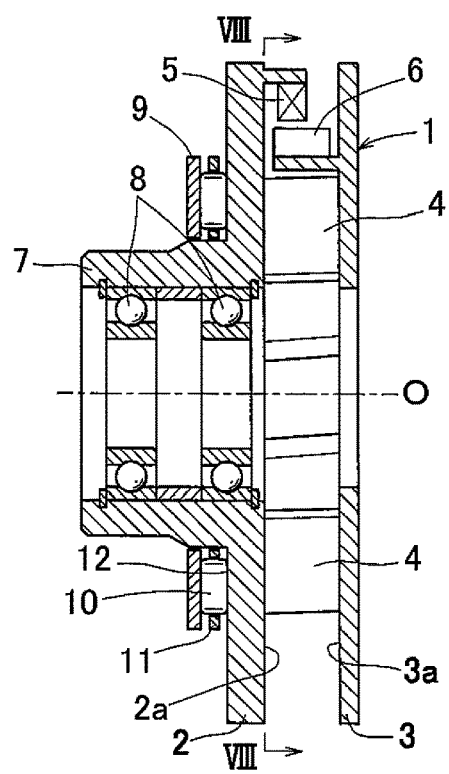
FIG. 7 is a sectional view of a modified example in which a magnetic target and a magnetic sensor element shown in FIG. 1 are arranged so as to be radially opposed to each other.
Figure 8:
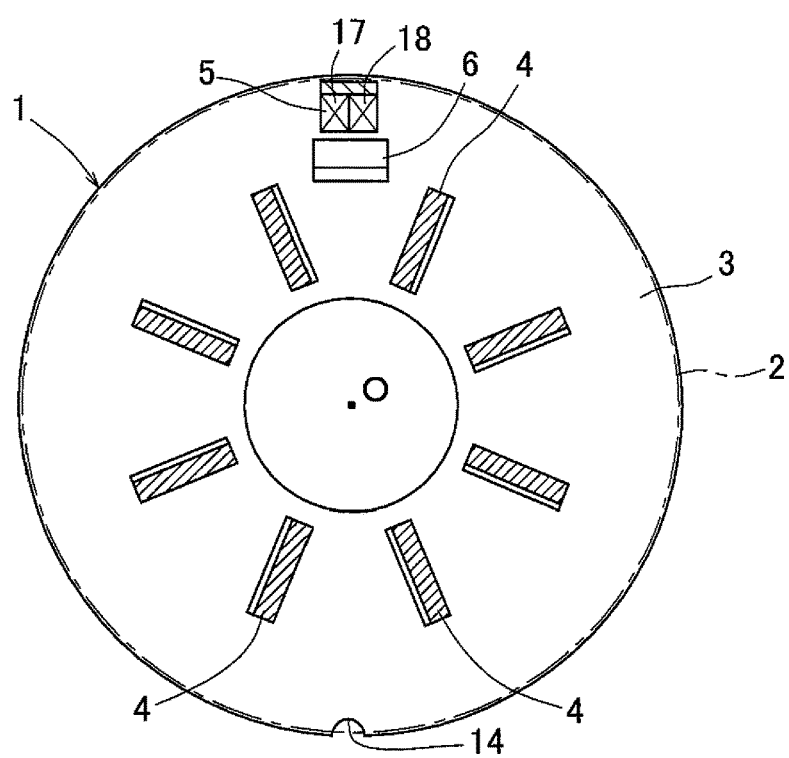
FIG. 8 is a sectional view taken along line VIII-VIII of FIG. 7.

As shown in FIGS. 7 and 8, the magnetic target 5 and the magnetic sensor element 6 may be arranged to face each other in the radial direction of the parallel plates 2 and 3. However, as in the above embodiment, the magnetic target 5 and the magnetic sensor element 6 are preferably arranged to face each other in the axial direction of the parallel plates 2 and 3, because with this arrangement, the magnetic target 5 and the magnetic sensor element 6 can be mounted to the parallel plates 2 and 3 more easily and thus at a lower cost.

In FIGS. 1 to 8, the magnetic target 5 is fixed to the parallel plate 2, while the magnetic sensor element 6 is fixed to the parallel plate 3. However, this relation may be reversed, that is, the magnetic sensor element 6 may be fixed to the parallel plate 2, while the magnetic target 5 may be fixed to the parallel plate 3.

Figure 9:
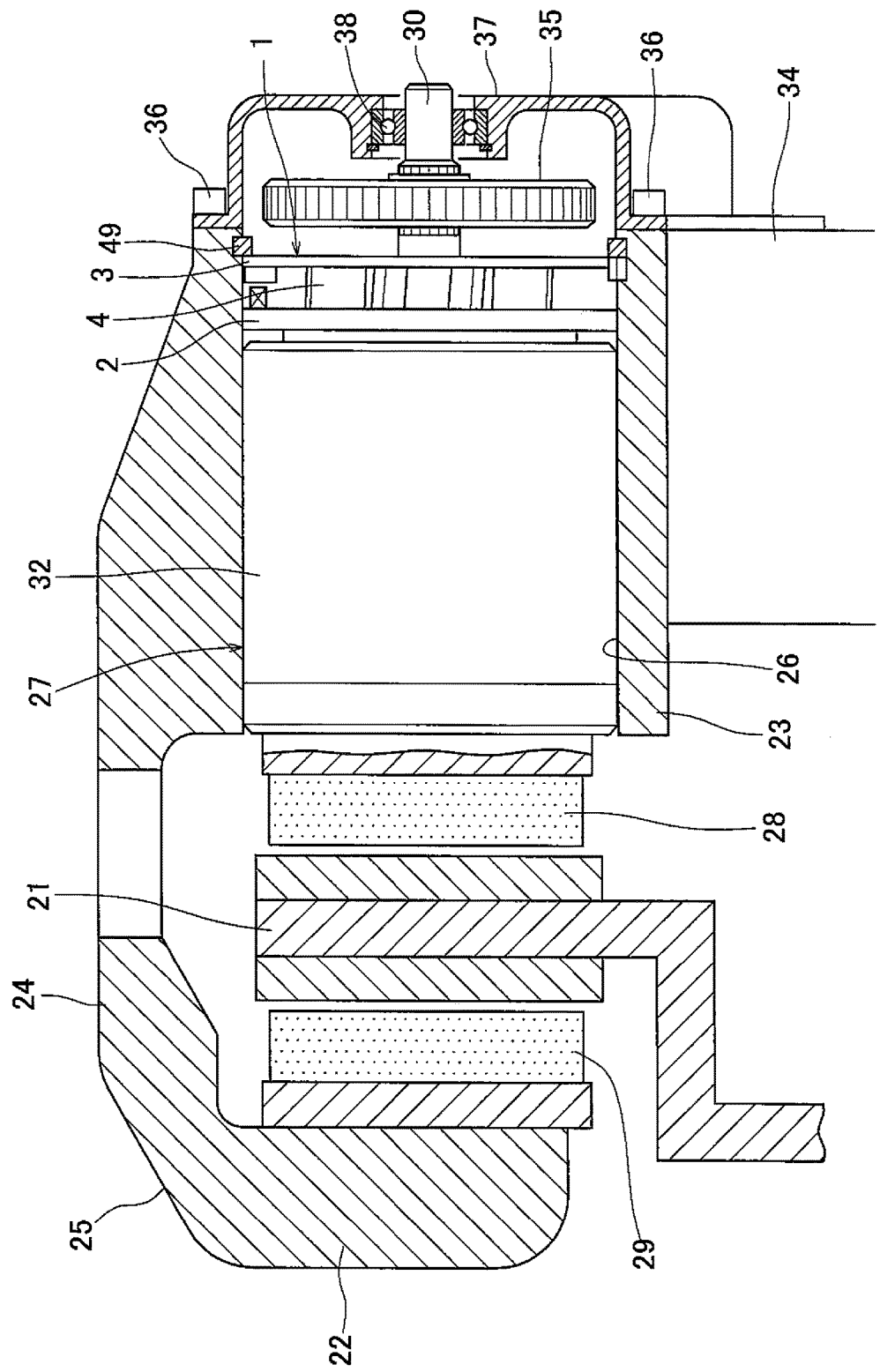
FIG. 9 is a sectional view of an electric brake system in which the load sensor shown in FIG. 1 is mounted.
Figure 10:
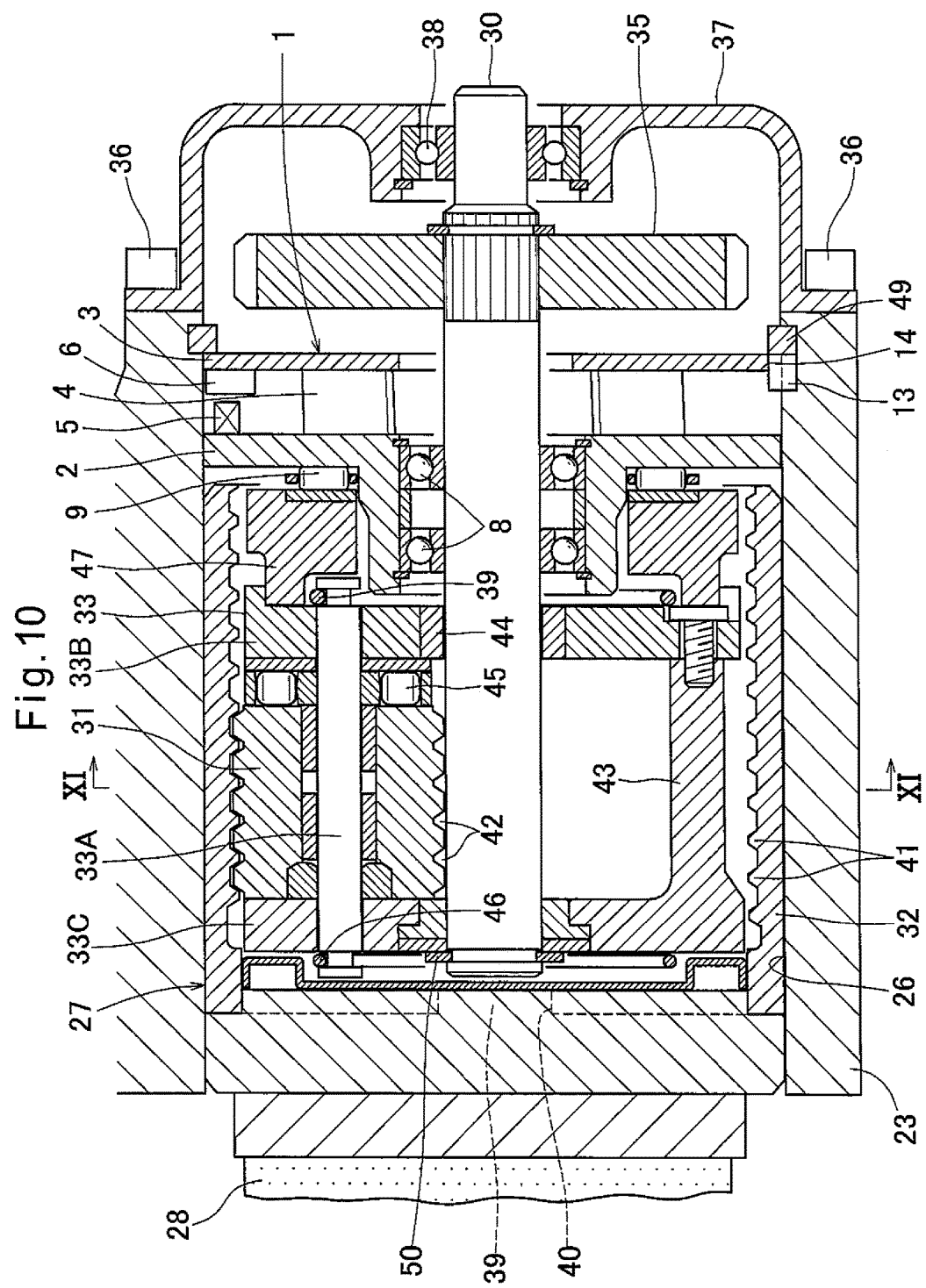
FIG. 10 is an enlarged sectional view of, and in the vicinity of, a linear motion actuator of FIG. 9
Figure 11:
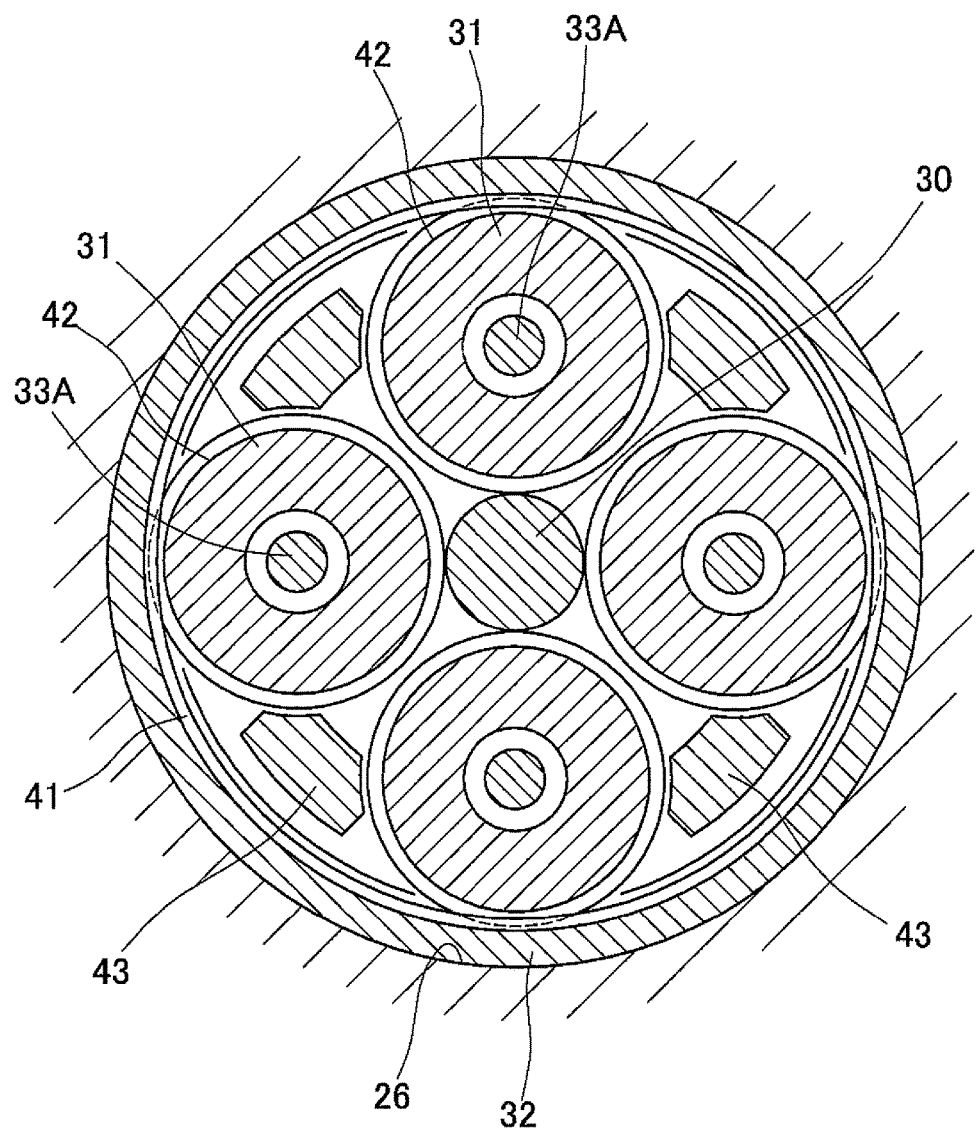
FIG. 11 is a sectional view taken along line XI-XI of FIG. 10.

FIGS. 9 to 11 show a vehicle electric brake system including the above-described load sensor 1.

This electric brake system includes a brake disk 21 configured to rotate together with a wheel, a caliper body 25 including opposed pieces 22 and 23 opposed to each other on both sides of the brake disk 21, and coupled together by a bridge 24, a linear motion actuator 27 mounted in a mounting hole 26 formed in the surface of the opposed piece 23 facing the brake disk 21, and a right and left pair of friction pads 28 and 29.

The friction pad 28 is disposed between the opposed piece 23 and the brake disk 21, and supported by a pad pin (not shown) mounted to the caliper body 25 so as to be movable in the axial direction of the brake disk 21. The other friction pad 29 is mounted to the other, opposite opposed piece 22. The caliper body 25 is supported so as to be slidable in the axial direction of the brake disk 21.

As shown in FIG. 10, the linear motion actuator 27 includes a rotary shaft 30, a plurality of planetary rollers 31 that are kept in rolling contact with the cylindrical surface on the outer periphery of the rotary shaft 30, an outer ring member 32 surrounding the planetary rollers 31, and a carrier 33 retaining the planetary rollers 31 such that the planetary rollers 31 are rotatable about the axes of the respective planetary rollers 31 and can also revolve around the rotary shaft 30. The actuator 27 further includes the load sensor 1, which are disposed axially rearward of the outer ring member 32.

The rotary shaft 30 is configured to be rotated by an electric motor 34 shown in FIG. 9 when the rotation of the electric motor 34 is transmitted thereto through a gear 35. The rotary shaft 30 is inserted in the mounting hole 26, which axially extends through the opposed piece 23, with one end thereof protruding from the axially rearward opening of the mounting hole 26. The gear 35 is rotationally fixed to the end of the rotary shaft 30 protruding from the mounting hole 26 by means of splines. The gear 35 is covered by a lid 37 fixed in position by bolts 36 to close the axially rearward opening of the mounting hole 26. A bearing 38 is mounted in the lid 37 to rotatably support the rotary shaft 30.

As shown in FIG. 11, the planetary rollers 31 are in rolling contact with the cylindrical surface on the outer periphery of the rotary shaft 30 such that when the rotary shaft 30 rotates, the planetary rollers 31 also rotate due to friction between the planetary rollers 31 and the rotary shaft 30. The planetary rollers 31 are circumferentially spaced apart from each other at regular intervals.

As shown in FIG. 10, the outer ring member 32 is mounted in the mounting hole 26 formed in the opposed piece 23 of the caliper body 25, and is axially slidably supported by the inner periphery of the mounting hole 26. Engaging recesses 40 are formed in the axially forward end of the outer ring member 32 such that engaging protrusions 39 formed on the back surface of the friction pad 28 is engaged in the engaging recesses 40. Due to the engagement of the engaging protrusions 39 in the engaging recesses 40, the outer ring member 32 is rotationally fixed to the caliper body 25.

The outer ring member 32 is formed, on the inner periphery thereof, with a helical rib 41, while each of the planetary rollers 31 has, on its outer periphery, circumferential grooves 42 in which the helical rib 41 engages, such that when the planetary rollers 31 rotate, the outer ring member 32 is moved in the axial direction with the helical rib 41 of the outer ring member 32 guided by the circumferential grooves 42. Instead of the circumferential grooves 42, of which the lead angle is zero, a helical groove having a lead angle different from that of the helical rib 41 may be formed in the outer periphery of each of the planetary rollers 31.

The carrier 33 includes carrier pins 33A rotatably supporting the respective planetary rollers 31, an annular carrier plate 33C keeping the axially forward ends of the carrier pins 33A circumferentially spaced apart from each other at regular intervals, and an annular carrier body 33B keeping the axially rearward ends of the carrier pins 33A circumferentially spaced apart from each other at regular intervals. The carrier plate 33C and the carrier body 33B are axially opposed to each other with the planetary rollers 31 disposed therebetween, and are coupled together by coupling rods 43 disposed between the circumferentially adjacent planetary rollers 31.

The carrier body 33B is supported by the rotary shaft 30 through a slide bearing 44 so as to be rotatable relative to the rotary shaft 30. Thrust bearings 45 are mounted between the respective planetary rollers 31 and the carrier body 33B to prevent the rotation of each planetary roller 31 about its axis from being transmitted to the carrier body 33B.

The carrier pins 33A are radially inwardly biased by radially compressible ring springs 46 wrapped around the carrier pins 33A. Under the biasing force of the radially compressible ring springs 46, the planetary rollers 31 are pressed at their outer peripheries against the outer periphery of the rotary shaft 30, preventing slippage between the rotary shaft 30 and the planetary rollers 31. In order to apply the biasing force of the radially compressible ring springs 46 over the entire axial length of each planetary roller 31, two of the radially compressible ring springs 46 are provided at the two opposed ends of each carrier pin 33A, respectively.

The load sensor 1 is fitted in the mounting hole 26 with the parallel plate 3 located axially rearward of the parallel plate 2. A spacer 47 is mounted between the carrier 33 and the load sensor 1 so as to rotate together with the carrier 33. The spacer 47 is rotatably supported by a thrust bearing 9. The rotary shaft 30 is rotatably supported by radial bearings 8 mounted in the cylindrical portion 7 of the parallel plate 2.

The load sensor 1 is prevented from axially rearward movement by a snap ring 49 which fitted in the inner periphery of the mounting hole 26 and engaging the outer peripheral edge of the parallel plate 3. The load sensor 1 in turn axially supports the carrier body 33B through the thrust bearing 9 and the spacer 47, thereby preventing axially rearward movement of the carrier 33. The carrier 33 is prevented from axially forward movement by a snap ring 50 fitted on the rotary shaft 30 at its axially forward end. The carrier 33 is therefore prevented from both axially forward and rearward movement, so that the planetary rollers 31, retained by the carrier 33, are also prevented from axial movement.

The key member 13, which is engaged in the inner periphery of the mounting hole 26, is fitted in the recess 14 formed in the outer periphery of the parallel plate 3. Due to engagement of the key member 13 in the recess 14, the parallel plate 3 is rotationally fixed to the inner periphery of the mounting hole 26.

Now the operation of this electric brake system is described.

When the electric motor 34 is activated, and the rotary shaft 30 rotates, the planetary rollers 31 rotate about the respective carrier pins 33A, while revolving around the rotary shaft 30. This causes axial relative movement between the outer ring member 32 and the planetary rollers 31 due to engagement of the helical rib 41 in the circumferential grooves 42. However, since the planetary rollers 31, as well as the carrier 33, are prevented from axial movement, only the outer ring member 32 is moved in the axial direction, with the planetary rollers 31 kept stationary in the axial direction. Thus, the linear motion actuator 27 is configured to convert the rotary motion of the rotary shaft 30, when driven by the electric motor 34, to the linear motion of the outer ring member 32, to apply an axial load to the friction pad 28 from the outer ring member 32. As a result, the friction pad 28 is pressed against the brake disk 21, thereby generating a braking force.

When the friction pad 28 is pressed against the brake disk 21, an axially rearward reaction force is applied to the friction pad 28. This reaction force is then transmitted through the outer ring member 32, planetary rollers 31, carrier 33 and spacer 47, and is received by the load sensor 1. When received by the load sensor 1, the reaction force deflects the coupling pieces 4 of the load sensor 1 such that the magnetic target 5 and the magnetic sensor element 6 move relative to each other in the circumferential direction. The relative displacement between the magnetic target 5 and the magnetic sensor element 6 changes the output signal of the magnetic sensor element 6. Thus, it is possible to detect the magnitude of the axial load based on the output signal of the magnetic sensor element 6. By carrying out feedback control of the load based on the output signal of the magnetic sensor element 6, the load can be controlled with high accuracy.

In this electric brake system, since the load sensor 1 is mounted such that an axially rearward reaction force applied to the friction pad 28 when the friction pad 28 is pressed against the brake disk 21 is received by the load sensor 1, if the load sensor 1 is low in rigidity in the axial direction (which means that the load sensor 1 tends to be axially deformed to a large degree when an axial load is applied to the load sensor 1), the response of braking may deteriorate, and/or the feedback control of the load may become unstable. It is therefore important to ensure high axial rigidity of the load sensor 1. By using load sensor 1 which is high in axial rigidity and thus tends to be axially deformed to a lesser degree when an axial load is applied, it is possible to improve the response of braking, and to stably perform feedback control of the load.

In this electric brake system, as the motion converter mechanism for converting the rotation of the rotary shaft 30 to the axial movement of the friction pad 28, a planetary roller mechanism is used, which includes the planetary rollers 31 kept in rolling contact with the cylindrical surface on the outer periphery of the rotary shaft 30, the carrier 33 retaining the planetary rollers 31 such that the planetary rollers 31 can rotate and revolve and prevented from axial movement, the outer ring member 32 surrounding the planetary rollers 31, the helical rib 41 formed on the inner periphery of the outer ring member 32, and the helical grooves or circumferential grooves 42 formed in the outer peripheries of the respective planetary rollers 31 such that the helical rib 41 engage therein. However, the above-described load sensor 1 may be mounted in an electric brake system in which a different motion converter mechanism is used.

Figure 12:
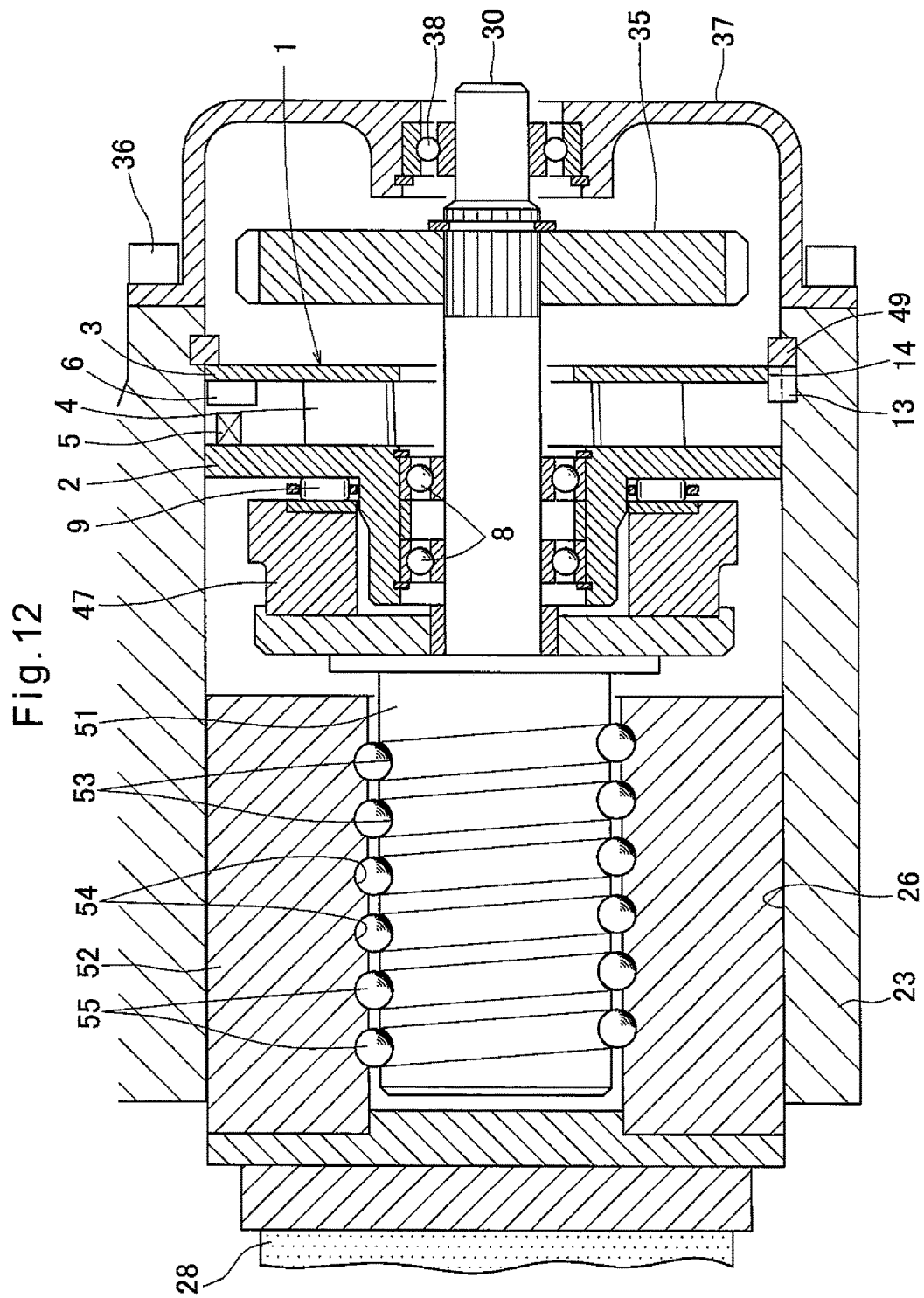
FIG. 12 is a sectional view of an electric brake system in which a ball-screw mechanism is used, and in which the load sensor shown in FIG. 1 is mounted.

By way of example, FIG. 12 shows an electric brake system in which a ball-screw mechanism is used as the motion converter mechanism, and in which the load sensor 1 is mounted. In FIG. 12, elements corresponding to those of the above embodiment are denoted by identical numerals, and their description is omitted.

The electric brake system shown in FIG. 12 includes a rotary shaft 30, a threaded shaft 51 integral with the rotary shaft 30, a nut 52 surrounding the threaded shaft 51, a plurality of balls 55 disposed between a thread groove 53 formed in the outer periphery of the threaded shaft 51 and a thread groove 54 formed in the inner periphery of the nut 52, and a return tube (not shown) through which the balls 55 are returned to the starting point of the thread groove 54 of the nut 52 from its terminal point. This brake system further includes the load sensor 1, which is disposed axially rearwardly of the nut 52.

The nut 52 is non-rotatably and slidably mounted in the mounting hole 26 formed in the opposed piece 23. A spacer 47 is provided at the axially rearward end of threaded shaft 51 so as to rotate together with the threaded shaft 51. The spacer 47 is supported by the thrust bearing 9 of the load sensor 1. Thus, the load sensor 1 axially supports the threaded shaft 51 through the spacer 47, thereby preventing axially rearward movement of the threaded shaft 51.

This electric brake system is configured such that when the rotary shaft 30 is rotated, the threaded shaft 51 and the nut 52 are rotated relative to each other, thus moving the nut 52 axially forwardly to press the friction pad 28 against the brake disk 21. At this time, an axially rearward reaction force acts on the friction pad 28. This reaction force is transmitted through the nut 52, threaded shaft 51 and spacer 47, and received by the load sensor 1. The reaction force thus deflects the coupling pieces 4 of the load sensor 1, causing circumferential relative displacement between the magnetic target 5 and the magnetic sensor element 6. Corresponding to the relative displacement between the magnetic target 5 and the magnetic sensor element 6, the output signal of the magnetic sensor element 6 changes. Thus, it is possible to detect the magnitude of the axial load based on the output signal of the magnetic sensor element 6.

Figure 13:
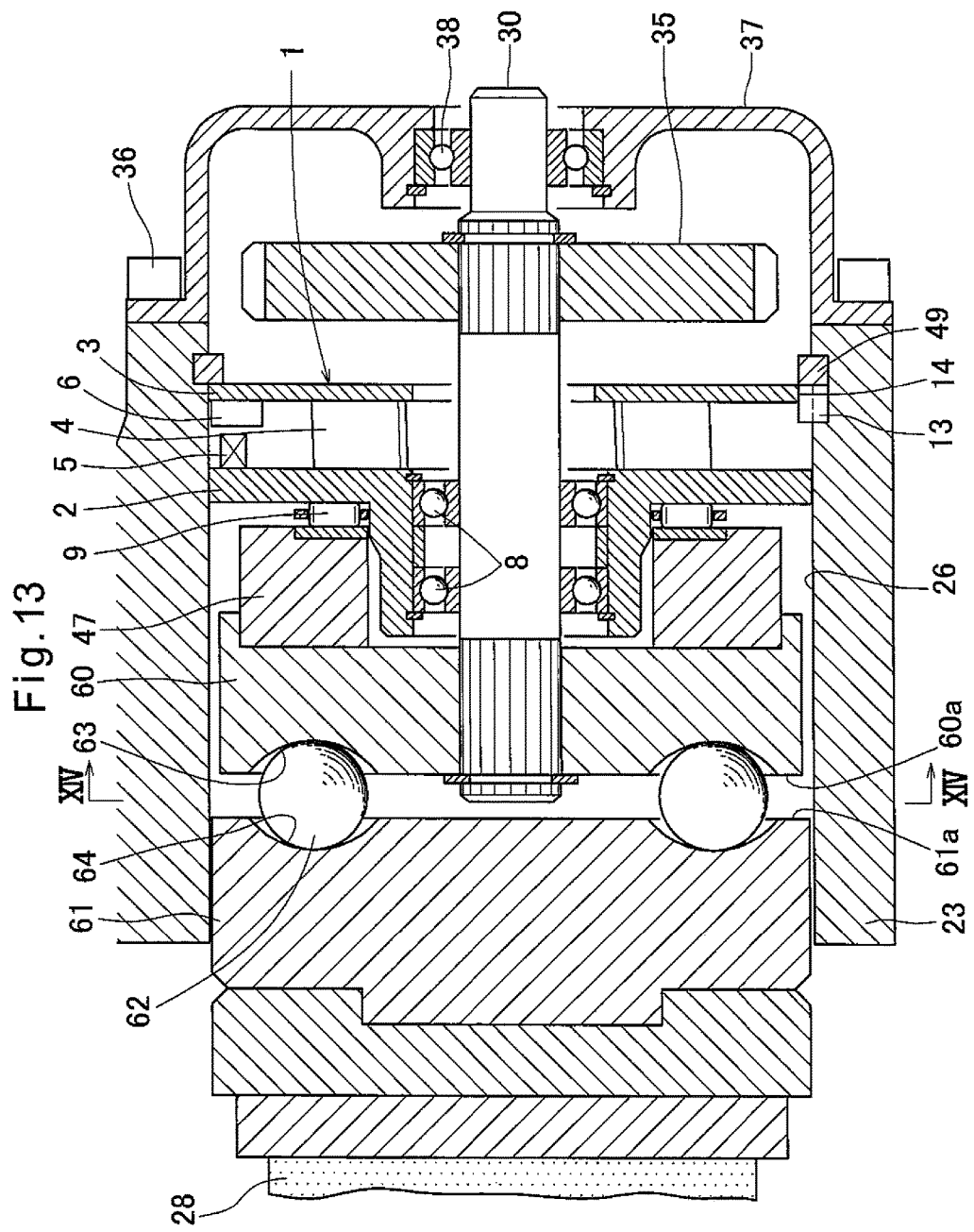
FIG. 13 is a sectional view of an electric brake system in which a ball-ramp mechanism is used, and in which the load sensor shown in FIG. 1 is mounted.

FIG. 13 shows an electric brake system in which a ball-ramp mechanism as the motion converter mechanism, and in which the load sensor 1 is mounted.

The electric brake system shown in FIG. 13 includes a rotary shaft 30, a rotary disk 60 rotationally fixed to the outer periphery of the rotary shaft 30, a linear motion disk 61 disposed axially forwardly of, and axially facing, the rotary disk 60, and a plurality of balls 62 disposed between rotary disk 60 and the linear motion disk 61. This brake system further includes the load sensor 1, which is disposed axially rearwardly of the rotary disk 60.

The linear motion disk 61 is mounted in the mounting hole 26 formed in the opposed piece 23 so as to be rotationally fixed and axially slidable, relative to the caliper body 25. A spacer 47 is provided at the axially rearward end of the rotary disk 60 so as to be rotatable together with the rotary disk 60. The spacer 47 is supported by the thrust bearing 9 of the load sensor 1. Thus, the load sensor 1 axially supports the rotary disk 60 through the spacer 47, thereby preventing axially rearward movement of the rotary disk 60.

Figure 14:
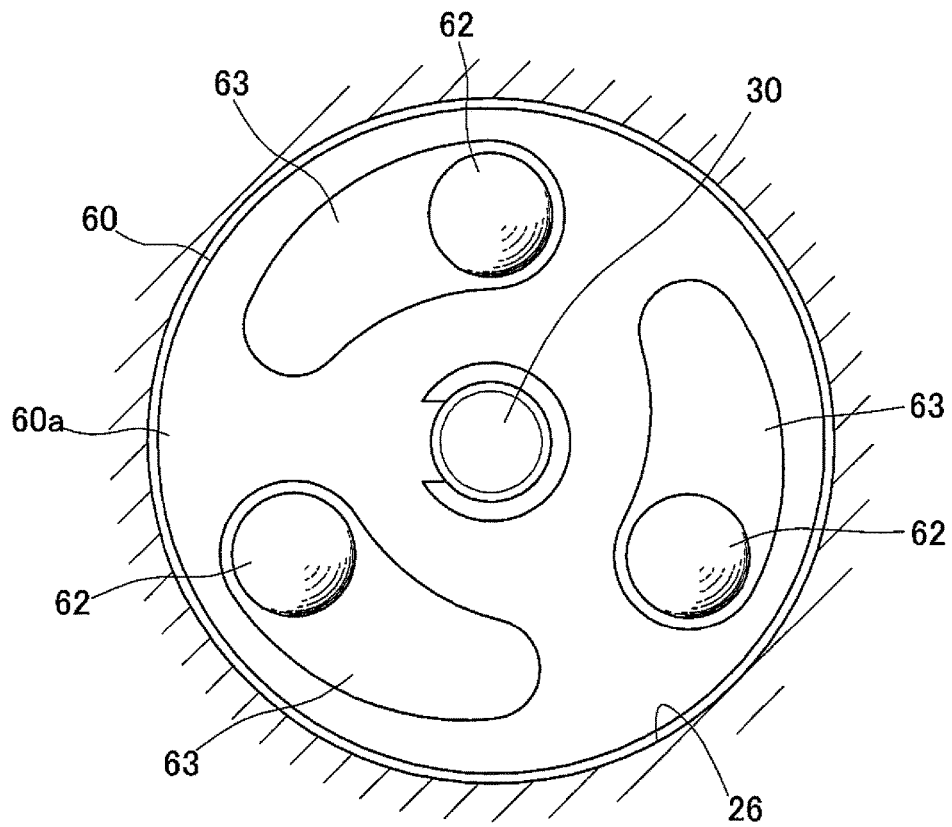
FIG. 14 is a sectional view taken along line XIV-XIV of FIG. 13.
Figure 15:
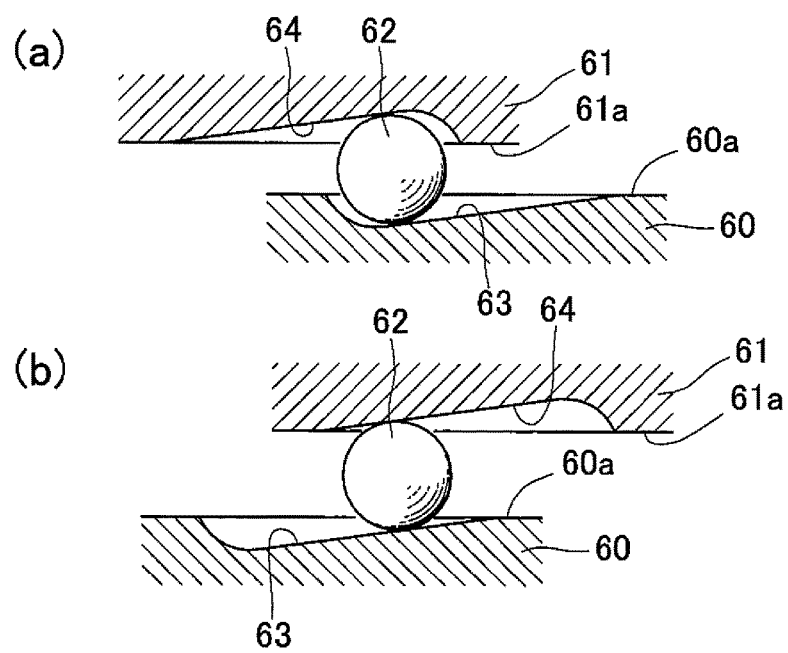
FIG. 15($a$) shows the relationship between a ball and inclined grooves shown in FIG. 14.

As shown in FIGS. 13 and 14, the rotary disk 60 has, in its surface 60a facing the linear motion disk 61, inclined grooves 63 whose depths gradually decrease in one of the opposite circumferential directions. The linear motion disk 61 has, in its surface 61a facing the rotary disk 60, inclined grooves 64 whose depths gradually decrease in the other of the opposite circumferential directions. As shown in FIG. 15(a), each ball 62 is fitted between each opposed pair of the inclined grooves 63 of the rotary disk 60 and the inclined grooves 64 of the linear motion disk 61, such that as shown in FIG. 15(b), when the rotary disk 60 rotates relative to the linear motion disk 61, the balls 62 roll in the respective pairs of inclined grooves 63 and 64 such that the distance between the rotary disk 60 and the linear motion disk 61 increases.

This electric brake system is configured such that when the rotary shaft 30 is rotated, the linear motion disk 61 and the rotary disk 60 are rotated relative to each other, thus moving the linear motion disk 61 axially forwardly to press the friction pad 28 against the brake disk 21. At this time, an axially rearward reaction force acts on the friction pad 28. This reaction force is transmitted through the rotary disk 60 and spacer 47, and received by the load sensor 1. The reaction force thus deflects the coupling pieces 4 of the load sensor 1, causing circumferential relative displacement between the magnetic target 5 and the magnetic sensor element 6. Corresponding to the relative displacement between the magnetic target 5 and the magnetic sensor element 6, the output signal of the magnetic sensor element 6 changes. Thus, it is possible to detect the magnitude of the axial load based on the output signal of the magnetic sensor element 6.

DESCRIPTION OF THE NUMERALS

1. Load sensor
2, 3. Parallel plate
2a, 3a. Opposed surface
4. Coupling piece
5. Magnetic target
6. Magnetic sensor element
9. Thrust bearing
10. Rolling element
12. Raceway
17, 18. Permanent magnet
21. Brake disk
28. Friction pad
34. Electric motor
O. Center

What is claimed is:

1. A load sensor comprising:
    a pair of parallel plates spaced apart from each other in an axial direction and extending parallel to each other;
    a plurality of coupling pieces arranged between the parallel plates and coupling the parallel plates together, the coupling pieces being spaced apart from each other;
    wherein all of the coupling pieces are inclined in an incline direction relative to the axial direction, and are connected to each of the pair of parallel plates such that when a load in the axial direction is applied to the parallel plates, the coupling pieces are deflected in such a manner that the parallel plates are displaced relative to each other in a direction perpendicular to the axial direction; and
    a displacement detector configured to detect an intensity of the load in the axial direction based on relative displacement between the parallel plates in the direction perpendicular to the axial direction.

2. The load sensor of claim 1, wherein all of the coupling pieces are inclined in a circumferential direction such that when the load in the axial direction is applied to the parallel plates, the parallel plates are moved relative to each other in the circumferential direction with centers of the respective parallel plates kept stationary.

3. An electric brake system comprising an electric motor, and a motion converter mechanism configured to convert a rotational motion of the electric motor to an axial movement of a friction pad, and configured to generate a braking force by pressing the friction pad against a brake disk, wherein the load sensor of claim 1 is mounted at a portion which receives an axially rearward reaction force that acts on the friction pad when the friction pad is pressed against the brake disk.

4. The load sensor of claim 1, wherein the coupling pieces are connected to each of the pair of parallel plates and equally spaced apart from each other such that, when the load in the axial direction is applied to the parallel plates, the coupling pieces are deflected in such a manner that the parallel plates are rotated relative to each other in a circumferential direction perpendicular to the axial direction.

5. A load sensor comprising:
a pair of parallel plates spaced apart from each other in an axial direction and extending parallel to each other;
at least one coupling piece coupling the parallel plates together,
wherein the at least one coupling piece is inclined relative to the axial direction and the at least one coupling piece is connected to each of the pair of parallel plates such that, when a load in the axial direction is applied to the parallel plates, the at least one coupling piece is deflected in such a manner that the parallel plates are rotated relative to each other in a circumferential direction perpendicular to the axial direction; and
a displacement detector configured to detect an intensity of the load in the axial direction based on relative displacement between the parallel plates in the circumferential direction perpendicular to the axial direction.

6. The load sensor of claim 5, wherein the displacement detector is provided between opposed surfaces of the parallel plates that face each other, and is located at radially outer portions of the respective opposed surfaces.

7. An electric brake system comprising an electric motor, and a motion converter mechanism configured to convert a rotational motion of the electric motor to an axial movement of a friction pad, and configured to generate a braking force by pressing the friction pad against a brake disk, wherein the load sensor of claim 5 is mounted at a portion which receives an axially rearward reaction force that acts on the friction pad when the friction pad is pressed against the brake disk.

\* \* \* \* \*